No. 883,426. PATENTED MAR. 31, 1908.
R. R. RUST.
PROCESS OF MAKING ZINC CHLORID.
APPLICATION FILED JUNE 12, 1905.
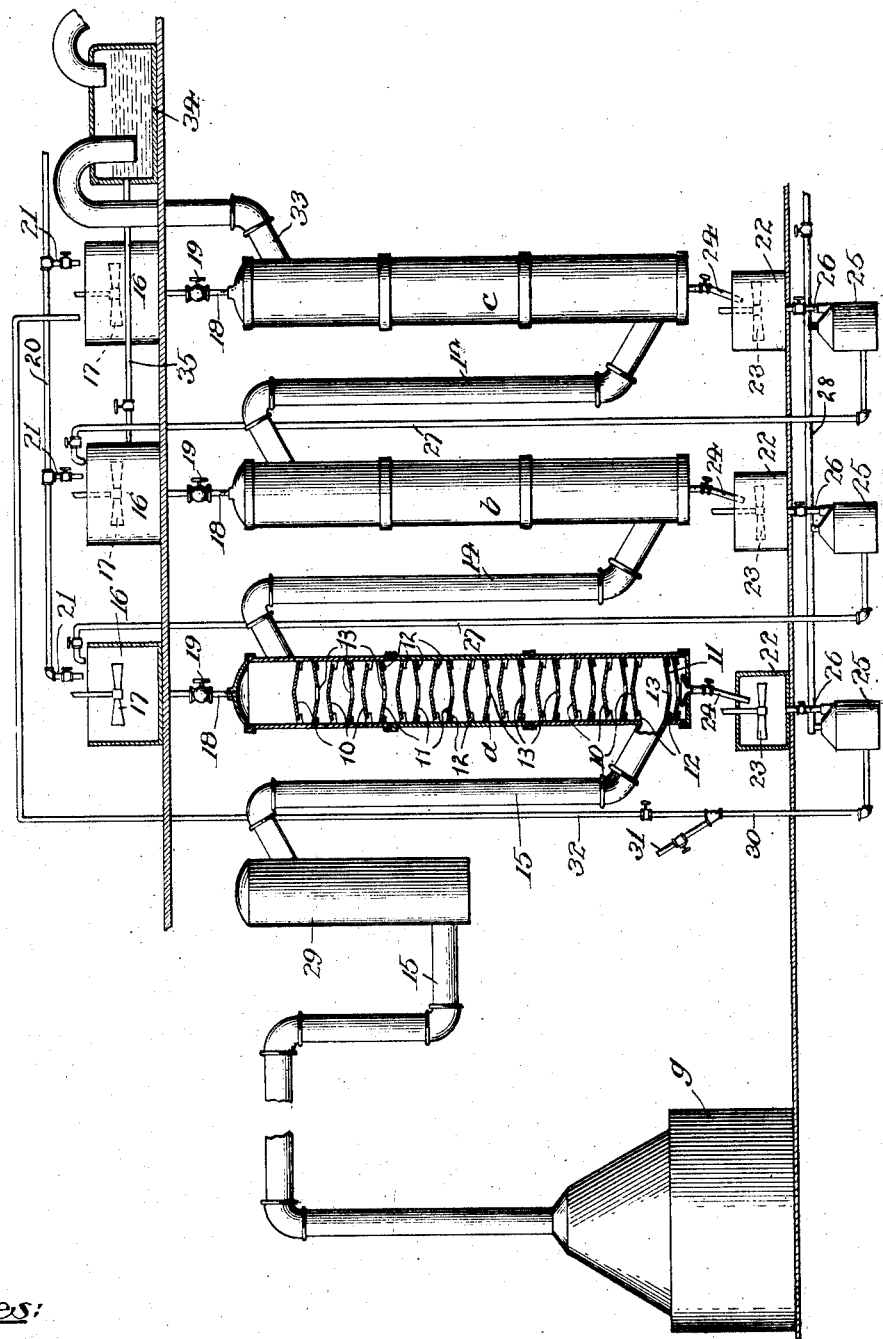

UNITED STATES PATENT OFFICE.

ROBERT R. RUST, OF WAUKEGAN, ILLINOIS.

PROCESS OF MAKING ZINC CHLORID.

No. 883,426.  Specification of Letters Patent.  Patented March 31, 1908.

Application filed June 12, 1905. Serial No. 264,812.

*To all whom it may concern:*

Be it known that I, ROBERT R. RUST, a citizen of the United States, and a resident of Waukegan, county of Lake, and State of Illinois, have invented certain new and useful Improvements in Processes of Making Zinc Chlorid, of which the following is declared to be a full, clear, and exact description.

The invention relates to the manufacture of zinc chlorid from ores or other zinkiferous material and seeks to provide a simple method by which the material may be submitted to the action of hydrochloric acid gas for the direct production of a highly concentrated solution of zinc chlorid.

The usual method heretofore for making zinc chlorid consists in treating metallic or zinc oxid in a suitably lined tank or vessel with a solution of hydrochloric acid to dissolve the zinc in the form of chlorid. The solution is drawn off and zinc oxid is added to precipitate impurities. The solution thus obtained does not usually contain more than 50% of zinc chlorid, but the trade prefers a much stronger solution. The concentration which is effected by evaporation is highly expensive since the dissociation of the zinc chlorid solution at high temperature into zinc hydro-oxid and hydrochloric acid, necessitates the use of small enameled pans for the concentration of the chlorid solution.

In accordance with the present invention, oxidized zinkiferous material is admixed with a small quantity of water or other suitable liquid, to form a pulp or slime. The water or other suitable liquid forms a vehicle or carrier through aid of which, the material is brought into immediate contact with the hydrochloric acid gas or fumes by flowing the mixed charge of material and all liquid carrier in layers over suitable surfaces. The surfaces or baffles are preferably arranged within a suitable closed chamber or tower into which the liquid or water vehicle carrying the pulverized material in suspension is introduced at the top and flows downwardly over the baffles, meeting the acid fumes which rise therein. The charge is thus broken up by the obstructions or baffles into separate portions or divided masses, and exposed in thin layers over a large surface to the gas which fills the space about the massage of charge and may thus effectively exert the desired chemical and solvent action. By this method very highly concentrated solution of zinc chlorid may be formed so that no further concentration is necessary.

In the accompanying drawings, is illustrated one form of apparatus which may be employed in carrying out the improved process. One of the chambers or towers is shown in section.

The towers $a$, $b$ and $c$, of which several are preferably arranged in series, and the obstructions or baffles therein may be constructed in any suitable manner, but should be formed of material capable of resisting the corroding action of any chemicals employed. The towers to resist the corrosive action of the acid gas conveniently formed of sections of tiling, as shown, may be placed one upon the other. The baffles are in the form of cone-shaped and inverted cone-shaped plates 10 and 11, which are formed of porcelain or earthen ware and are alternately arranged within the tower on supporting lugs 12. The edges of the conical plates 10 are spaced from the sides of the tower, as indicated, while the inverted cone-shaped plates 11 are provided with central openings 13. The slope of the baffles is slight so that the circulation or flow of the charge through the tower is slow and ample time afforded for the action of the treating fumes.

The gas inlet at the lower end of each tower is connected to the outlet at the upper end of the preceding tower by a conduit 14, while the first tower $a$ of the series, is connected at its lower end to a generator $g$ or other suitable source of supply, by a conduit 15. Above the upper end of each tower, is a mixing tank 16 provided with an agitator 17 of any suitable construction. The several chambers or towers communicate with the tanks 16 through inlet pipes 18 having valves 19. A pipe 20 for water or other liquid vehicle or carrier, is provided with valved nozzles 21 leading to the several tanks 16.

Below each chamber or tower is arranged a mixing tank 22 having an agitator 23, and into which lead the valved outlet pipes 24 from the adjacent towers. Any suitable means may be employed for forcing the slime or mixed charge of liquid vehicle and ground material from each of the tanks 22 to the tanks 16 above the preceding tower of the series. Preferably, receptacles or so-called "acid eggs" 25, may be arranged beneath the tanks 22, which communicate therewith through the valved pipes 26. The charge is forced from the receptacles 25 through pipes 27 to the tanks 16, by aid of air under pressure admitted to the receptacles from a pipe 28.

In carrying out the improved process, the zinc or other zinkiferous material is first roasted, if necessary to oxidize it, and is finely ground with a small quantity of water in the tank 16 above the chamber or tower c, and may be mixed therein by agitator 17 or in a preliminary mixing tank to form a pulp or slime in which the ground material is held in suspension in the liquid carrier, and which is preferably of rather thick consistency so that the flow through the treating towers may not be too rapid. The charge is then passed through the tower c to the tank 22 beneath it, and from thence to the tank 16 above the tower b, and so on down through several chambers of the series while the hydrochloric acid gas from the generator g pass upwardly through the several towers a, b and c in the reverse order. In this way the strongest fumes act upon the weakest portions of the charge and vice versa.

In each tower, the slime or mixed charge of pulverized solid and liquid vehicle is broken up by the baffle plates 10 and 11 into separate portions or divided masses and is spread out in thin layers over the surface of the baffles so that it is placed in intimate relation to the gas in the tower that fills the space therein about the divided masses or thin layers of charge, or, in other words, charge is exposed over a large area thereto, so that the desired solvent or chemical action of the gas upon the pulverized solid carried by the liquid vehicle or carrier, may proceed rapidly and efficiently. If necessary, the charge may be agitated in each of the tanks 16, and 22 to mix its ingredients and insure that the ground material will be effectively held in suspension and will not settle out as it is passed through the apparatus. If desired, fresh pulverized zinkiferous material may be added in each of the tanks 16.

Hydrochloric acid gas is made in generator g, in the well known manner, by the treatment of common salt with sulfuric acid. The acid fumes pass from the generator through pipe 15 which is preferably of considerable length so as to cool the gas, and in which is interposed the cooling chamber 29, which serves to trap out any liquid of condensation. From the cooling chamber 29, the hydrochloric acid gas passes through the several towers and acts upon the finely ground zinc ore to form the soluble chlorid in accordance with the reaction:—

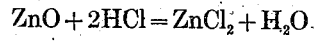

As water is formed by this reaction and as a highly concentrated solution of the chlorid is desired, little water is mixed with the ore in the first instance. Indeed, once the process is started in operation all the water necessary to act as the vehicle or carrier for the ground material and as a solvent for the chlorid, will be formed by the reaction.

The charge from the tank 22 beneath the tower a, consisting of the concentrated solution of chlorid and the tailing, is forced through a pipe 30 and branch pipe 31 to a suitable settling tank for the separation of the solution from the tailings. By adding fresh zinc oxid in the settling tank, any chlorid of iron present is precipitated. If the charge has not received sufficient treatment, it may be returned from the tank 22 beneath tower a to the tank 16, above tower c by pipe 30 and branch pipe 32 for repassage through the apparatus.

Any hydrochloric gas passing from tower c through exit pipe 33, is dissolved in water contained in a receptacle 34, of which several may be employed if necessary. The resultant acid solution may be returned into the charge through a pipe 35. By the direct action of hydrochloric acid gas upon a slime or pulp formed of ground oxidized zinkiferous material, it has been found in practice that a highly concentrated eighty percent. solution of zinc chlorid may be formed, so that further concentration, as with the methods usually employed, is unnecessary.

It is obvious that changes may be made in the details set forth without departure from the essentials of the invention.

Having described my invention, what I claim as new and desire to secure by Letters Patent, is:—

1. The method of making zinc chlorid from oxidized zinkiferous material, which consists in admixing the pulverized material in a limited quantity of a suitable liquid carrier and circulating the same by aid of such liquid carrier through a retainer chamber, the charge being there subjected, in course, to hydrochloric acid gas filling the space in said chamber about the charge; substantially as described.

2. The method of making zinc chlorid from oxidized zinkiferous material, which consists in admixing the pulverized material in a limited quantity of a watery carrier sufficient to form a slime, circulating the slime, in divided masses, through a retainer chamber in one direction and there subjecting the charge, in course, to hydrochloric fumes circulating in opposite direction in the free space in said chamber about the divided masses of charge, substantially as described.

3. The method of making zinc chlorid from oxidized zinkiferous material, which consists in admixing the pulverized material with a limited quantity of a watery carrier sufficient to form a sluggish slime, circulating the slime by gravity flow, in divided masses, through a retainer chamber free from liquid submersion, and subjecting the divided masses, in course, to hydrochloric acid gas circulating oppositely in the space about the divided masses of charge, whereby the resultant zinc chlorid becomes more concentrated as the charge advances from stage to stage, substantially as described.

4. The method of making zinc chlorid from oxidized zinkiferous material, which consists in admixing the pulverized material with a limited quantity of a watery carrier sufficient to form a slime, circulating the slime, in divided masses through retainer chambers, there subjecting the charge, in course, to hydrochloric acid gas circulating oppositely in the space about the divided mass of charge and making further addition of pulverized zinkiferous material to the charge at intermediate points, substantially as described.

ROBERT R. RUST.

Witnesses:
 GEO. C. STONE,
 KATHARINE GERLACH.